United States Patent [19]

Kunkle et al.

[11] 4,003,819
[45] Jan. 18, 1977

[54] FILTRATION OF SOLIDS SUSPENSION ENHANCED BY APPLIED DC POTENTIAL

[75] Inventors: Albert C. Kunkle; William Floyd Abercrombie, Jr., both of Macon, Ga.

[73] Assignee: J. M. Huber Corporation, Borger, Tex.

[22] Filed: Dec. 13, 1974

[21] Appl. No.: 532,662

Related U.S. Application Data

[63] Continuation of Ser. No. 436,413, Jan. 25, 1974, abandoned, and a continuation-in-part of Ser. No. 401,086, Sept. 26, 1973, abandoned, which is a continuation of Ser. No. 263,380, June 5, 1972, abandoned.

[52] U.S. Cl. .......................... 204/301; 204/180 R; 204/300 R; 204/300 EC
[51] Int. Cl.² ........................................ B01D 13/02
[58] Field of Search .............. 204/180 R, 299, 300, 204/301

[56] References Cited

UNITED STATES PATENTS

| 1,229,203 | 6/1917 | Schwerin | 204/180 R |
| 1,366,456 | 1/1921 | Highfield | 204/180 R |
| 1,435,886 | 11/1922 | Acton | 204/180 R |
| 3,642,605 | 2/1972 | Chenel et al. | 204/300 |

Primary Examiner—John H. Mack
Assistant Examiner—A. C. Prescott
Attorney, Agent, or Firm—Harold H. Flanders; August E. Roehrig, Jr

[57] ABSTRACT

A method of filtering solid particles contained in a suspension thereof wherein a rotatable filter assembly is rotated through the suspension to cause a filter cake to accumulate thereon and a DC voltage is applied across the filter cake to cause liquid entrained therein to migrate electroosmotically from the cake and through the filter cloth of the filter assembly.

10 Claims, 2 Drawing Figures

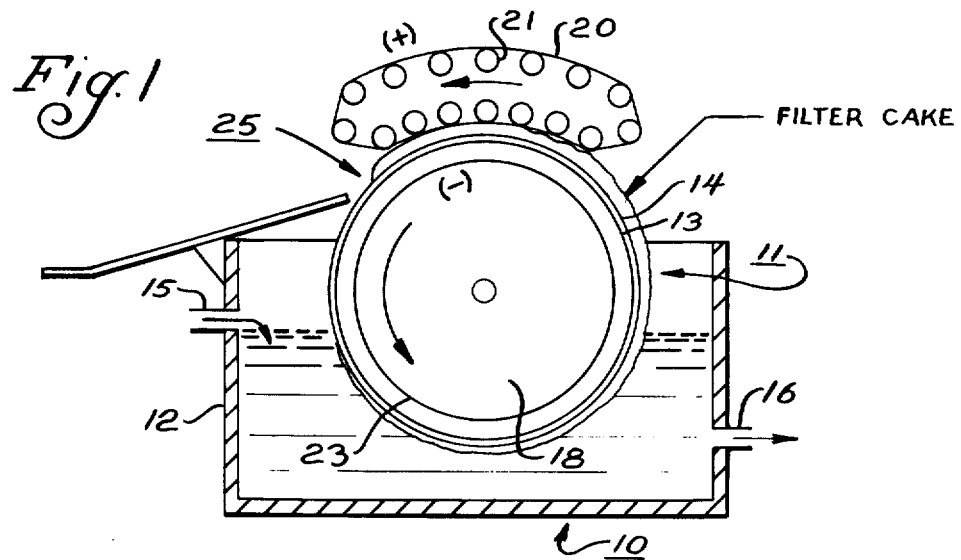
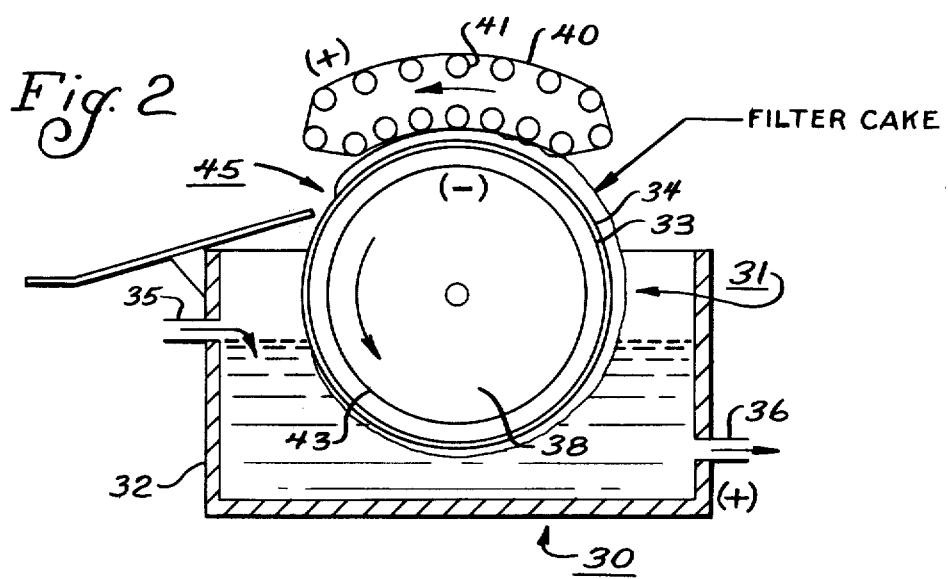

FILTRATION OF SOLIDS SUSPENSION ENHANCED BY APPLIED DC POTENTIAL

REFERENCE TO RELATED APPLICATIONS

This application is a continuation of application Ser. No. 436,413 filed Jan. 25, 1974, and is a continuation-in-part of copending application Ser. No. 401,086 filed Sept. 26, 1973, which is a continuation of Ser. No. 263,380 filed June 5, 1972, in the names of Albert C. Kunkle et al.

BACKGROUND OF THE INVENTION

This invention relates to filtration and, more particularly, to the use of a direct current to improve the filtration operation.

Clays such as kaolin, bentonite and the like are widely used as adsorbents, pigments, catalysts, paper fillers and the like. These clays generally occur in geological deposits as mixtures with inert foreign materials, and it is necessary to separate the clay material before the clay is utilized in commercial application.

In effecting the separation, the crude clay is dispersed in water with the aid of dispersing chemicals such as sodium silicate, sodium hexametaphosphate, sodium tripolyphosphate and tetrasodium pyrophosphate, and the clay slurry is blunged, degritted, classified and leached to effect removal of the undesired foreign materials. Following these steps, the clay is then filtered to remove the dispersing and leaching chemicals and recover the solids portion of the suspension. A 50% to 60% solids cake is then redispersed and spray dried or otherwise dried in the flocculated state.

In the filtration of clay suspensions, the conventional practice is to employ a rotary drum vacuum filter. An adequate description of such filters may be obtained by reference to any standard text as, for example, the *Encyclopedia of Chemical Process Equipment;* Ed. Wm. J. Mead; Reinhold Publishing Co., N.Y., N.Y.; 1964, pp. 417–38; *Chemical Engineers' Handbook;* J. H. Perry, Ed.; McGraw-Hill Book Co., N.Y., N.Y.; 1963, pp. 19 – 73 to 19 – 86; W. L. McCabe and J. C. Smith, *Unit Operations of Chemical Engineering;* 2d Ed.; McGraw-Hill Book Co., N.Y., N.Y.; 1967; pp. 880–904; A. S. Foust et al., *Principles of Unit Operations;* John Wiley & Sons, Inc., N.Y., N.Y.; 1960; pp. 490–500.

Rotary drum vacuum filters generally comprise a filter drum rotatably mounted in a casing or housing. A filter medium is mounted on the exterior surface of the drum and a vacuum is maintained within the drum interior. The filter drum rotates in a suspension of solid material in a liquid supplied to the lower portion of the casing. As the filter drum is rotated, the vacuum within the drum causes the liquid to pass through the filter medium and into the interior of the drum leaving a solid residium or filter cake on the filter surface. The filter cake is then removed as the drum rotates out of the suspension. The removed filter cake is then further processed as desired. The liquor or filtrate is removed from the interior of the drum and may also be processed as desired. In using such filtration equipment, the filtration produced thereby is not a perfect solids-liquid separation. The filtration actually separates the clay suspension into two parts; (1) a liquid stream or filtrate which passes through the filter medium and contains most of the suspension liquor and a low concentration of solids and (2) a filter cake which remains on the filter medium and contains a major portion of solids and a minor portion of entrained suspension liquor.

Using nylon, polyester or polypropylene filter cloths having a porosity between 0.5 to 4 cubic feet per minute in conjunction with rotary drum vacuum filters, it is possible to obtain cake soids in the order of 60% with filtrate solids on the order of 2% or less at a rate of approximately 15 pounds of dry clay per hour per square foot of filter area. The 60% solids cake is then redispersed and spray dried or otherwise dried in the flocculated state.

As it is for economic reasons desirable in the clay industry to ship slurries containing 70% solids, it is conventional in the clay art to add approximately 35% to 50% by weight spray dried clay to a 50% to 60% solids redispersed filter cake to yield a 70% solids slurry. The addition of spray dried clay to dispersed clay filter cake to prepare a 70% solids slurry for shipment adds significantly to the cost of the shipped slurry due to the relatively high costs of preparing the spray dried clay. The art, therefore, has been continually seeking to effect methods whereby clay filter cakes containing 70% clay can be directly obtained from clay suspensions without the addition of spray dried clay.

SUMMARY OF THE INVENTION

In accordance with the present invention, there is provided a method for obtaining clay filter cakes having clay solids content of 70%, wherein an aqueous clay suspension having a clay solids content considerably less than 70% is introduced into a filtration cell equipped with a rotatably mounted filter substantially impermeable to clay solids and an anode and cathode spaced apart from the upper and lower surfaces, respectively, of the filter. The filter is rotated through an aqueous suspension containing the clay to be separated therefrom, and deposition of a clay filter cake is effected on the filter. Upon deposition of the filter cake, a direct current field is applied between the anode and cathode causing the water entrained in the clay deposit on the filter between the electrodes to be directed electroosmotically through the filter towards the cathode located beneath the filter surface.

BRIEF DESCRIPTION OF THE DRAWING

Objects of the invention, together with additional features contributing thereto and advantages accruing therefrom, will be apparent from the following description of one embodiment of the invention when read in conjunction with the accompanying drawing wherein;

FIG. 1 is a schematic cross-sectional representation of one embodiment of an apparatus for use in the practice of the present invention.

FIG. 2 is a schematic cross-sectional representation of a second embodiment of an apparatus which may be used to practice the process of the present invention.

PREFERRED EMBODIMENTS

Referring now to FIG. 1, the filtration cell 10, as shown, consists of a rotatably mounted cylindrical drum 11 supported for rotation about a horizontal axis in housing 12 and having mounted on the outer surface 13 thereof a filter cloth 14. The rotation of the drum is effected by a source of power, not shown. The filter cloth 14 is formed of a porous fabric which is adapted to permit diffusion of water therethrough but is substantially impermeable to the passage of clay solids.

Means, now shown, are provided to discharge water entering the filter cloth. The drum is partially immersed in a clay suspension which is circulated through the housing 12 by suspension inlet means 15 and suspension outlet means 16. Vacuum means, not shown, are provided to maintain the interior 18 of the drum 11 under a suitable vacuum. Spaced apart, but substantially concentric with the filter cloth 14, is a flexible metallic belt 20 in the form of an endless belt which passes over an array of rollers 21 so arranged to conform the belt 20 to the filter cloth 14 and flexible enough to adapt to the outer contours of the filter cake which is deposited on the surface of the cloth 14 during rotation of the drum. Belt 20 is positioned in contact with and arranged as to provide electrical contact with the outside surface of the filter cake which is deposited on the cloth so that the cake material is exposed to an electrical field upon passing into the throat formed between belt 20 and filter cloth 14.

Mounted on the interior 18 of the drum immediately below the underside of the drum surface, but spaced apart therefrom, is cathode 23. The cathode 23 is preferably aligned concentrically with the cylindrical surface of the drum and may be perforated or constructed of a screen-like material so as not to interfere with the vacuum system of the filter. Alternatively, the cathode 23 may be stainless steel or other electrode material. The endless belt 20 and the cathode 23 are connected to a source of DC potential, the endless belt forming the anode of the electrode assembly.

During operation of the filter cell, the drum 11 is rotated through the suspension and the bulk of the water in the suspension is drawn through the filter cloth 14 and into the interior 18 of the drum 11 due to the lower pressure therein and deposits the suspended solids as a cake on the filter. As the surface of the drum rotates out of the clay suspension, the cake deposited on the filter contains an excessive amount of liquid. The cake on the filter surface is then brought into electrical contact with the conductive endless belt 20 effecting additional dewatering of the cake. Upon contact with the belt 20, a DC current is caused to be applied between the belt 20 and the cathode 23 across the filter cake. The application of the DC potential causes a substantial portion of the liquid contained in the cake to electroosmotically migrate from the cake and pass through the filter 14 into the interior 18 of the drum 11 from which it is then removed along with the water removed from the suspension by vacuum filtration. The filter cake is removed from the filter surface by a suitable means such as a scraper at a suitable point 25 after electroosmotic dewatering has been effected. Upon removal, the removed solids are discharged into a suitable clay cake collection means, not shown.

As an example of the operation of the apparatus of the Figure, a filter cake of 70% clay solids was obtained by the application of an electromotive force of 50 volts applied between the metallic belt 20 and cathode 23. By way of contrast, when an electromotive force was not applied across the belt 20 and cathode 23, the filter cake was found to have a clay solids content of only 60%.

In FIG. 2, the filtration cell 30, as shown, is similar in construction to cell 10 and consists of a rotatably mounted cylindrical drum 31 supported for rotation in housing 32 and having mounted on the outer surface 33 thereof a porous filter cloth 34 permeable to water but substantially impermeable to clay solids. Means, not shown, are provided to discharge water entering the filter cloth. The drum is partially immersed in a clay suspension which is circulated through the housing 32 by suspension inlet means 35 and suspension outlet means 36. Rotation of the drum is effected by a source of power not shown. Vacuum means, not shown, are provided to maintain the interior 38 of the drum 31 under a suitable vacuum. Spaced apart and concentric with the filter cloth 34 is an endless flexible metallic belt 40 which passes over an array of rollers 41 so arranged to conform the belt 40 to the filter cloth 34, and flexible enough to adapt to the outer contours of the filter cake which is deposited on the surface of the cloth 34 during rotation of the drum. Belt 40 is preferably in contact with and may be so arranged as to provide electrical contact on the outside surface of the filter cake which is deposited on the cloth so that the cake material is exposed to an electrical field upon passing into the throat formed between belt 40 and filter cloth 34. Mounted on the interior 38 of the drum immediately below the underside of the drum surface, but spaced apart therefrom, is electrode 43. The electrode 43 is preferably aligned concentrically with the cylindrical surface of the drum and may be perforated or constructed of a screen-like material so as not to interfere with the vacuum system of the filter. The endless belt 40, the electrode 43, and the housing 32 are connected to a source of DC potential, the endless belt and the housing 32 being postively charged and the electrode 43 being negatively charged.

During operation of the filter cell 30, the drum 31 is rotated through the suspension from which the liquid is drawn through the filter cloth 34 and into the interior 38 of the drum 31. As the surface of the drum emerges from the clay suspension, the cake on the filter surface is brought into electrical contact with the positively charged endless belt 40. Due to the application of the positive charge, the liquid contained in the cake is caused to electroosmotically migrate from the cake and pass through the filter 34 into the interior 38 of the drum 31 from which it is then removed along with the water removed from the suspension by vacuum filtration. The imposition of a positive charge on the housing 32 accentuates the amount of cake collected during the rotation of the drum through the slurry. The positively charged belt 40 caused the dewatering of the filter cake deposited on the drum 31. The filter cake is removed from the filter surface by a suitable means such as a scraper at a suitable point 45 after electroosmotic dewatering has been effected. Upon removal, the removed solids are discharged into a suitable clay cake collection means, not shown.

In applying a potential across the anode and cathode of the filtration cell of the present invention, the potential is advantageously in the range of 10 to 200 volts (DC) and typically about 50 volts. Any of the well known and conventional means of establishing a direct current potential may be employed.

The electrodes used in the apparatus of the present invention may be formed of any suitable conductor having the desired mechanical properties. Typical cathode materials include stainless steel or aluminum. Typical anode materials include antimony-lead alloy, platinum and conductive coatings on tantalum or titanium.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intent that this invention not be limited to the particular embodiment disclosed as the best mode contemplated for carrying out this invention, but that the invention will include all embodiments falling within the scope of the appended claims.

What is claimed is:

1. A filter apparatus for solid liquid separation which comprises
   a tank for the material to be filtered, a hollow cylindrical drum supported for rotation about a horizontal axis in the tank,
   said drum being partially immersed in the material in the tank during the operation of the filter,
   filter means impervious to solid particles mounted on the outer surface of the drum,
   means for maintaining the interior region within the drum under vacuum,
   a first electrode disposed above the filter means,
   a second electrode disposed within the drum and spaced from the inner surface thereof,
   means for applying a source of DC potential to create an electric field across said electrodes,
   means for rotating said drum,
   means for removing the filter cake deposited on the filter means, and
   means for withdrawing filtrate from the drum interior.

2. The apparatus of claim 1 wherein said second electrode is disposed within the interior of the drum and is arranged concentrically within the drum surface.

3. The apparatus of claim 1 wherein said second electrode is permeable to the passage of liquid.

4. The apparatus of claim 1 wherein said first electrode comprises a flexible endless belt substantially conforming to the surface of the drum and arranged to compressively engage filter cake deposited on the filter means.

5. The apparatus of claim 1 further including means for applying a DC potential to said tank.

6. The apparatus of claim 5 wherein said second electrode is disposed within the interior of the drum and is arranged concentrically with the drum surface.

7. The apparatus of claim 5 wherein said second electrode is permeable to the passage of liquid.

8. The apparatus of claim 5 wherein said first electrode comprises a flexible endless belt substantially conforming to the surface of the drum and arranged to engage filter cake deposited on the filter means.

9. A filter apparatus for electrophoretic solid liquid separation of clay particles suspended in a liquid which comprises
   a tank for the clay suspension to be filtered, a hollow cylindrical drum supported for rotation about a horizontal axis in the tank,
   said drum being partially immersed in the clay suspension in the tank during the operation of the filter,
   filter means supported on the outer surface of said drum for retaining the suspended clay particles thereon while passing the liquid filtrate therethrough,
   means for maintaining the interior region within the drum under vacuum,
   a first electrode disposed above the filter means comprising a flexible endless belt substantially conforming to the surface of the drum and arranged to compressively engage filter cake deposited on the filter means,
   a second electrode disposed within the interior of the drum and concentrically spaced from the inner surface of the drum,
   means for applying a source of DC potential across said electrodes of from 10 – 200v.,
   means for rotating said drum to deposit clay particles on the filter means and to remove liquid from the filter cake by the electric field between said electrodes and by the vacuum within said drum,
   means for removing the filter cake deposited on the filter means, and
   means for withdrawing filtrate from the drum interior.

10. The apparatus of claim 9 further including means for applying a DC potential to said tank.

* * * * *